United States Patent Office 3,171,852
Patented Mar. 2, 1965

3,171,852
SALTS OF PHENYL ESTERS OF TRIALKYL AMMONIUMETHANESULFONIC ACIDS
Harry Distler, Gerhard Leibner, and Ernst-Heinrich Pommer, Ludwigshafen (Rhine), and Herbert Stummeyer, Mannheim, Germany, assignors to Badische Anilin- & Soda-Fabrik Aktiengesellschaft, Ludwigshafen (Rhine), Germany
No Drawing. Filed July 30, 1962, Ser. No. 213,161
Claims priority, application Germany, Sept. 6, 1961, B 63,913
1 Claim. (Cl. 260—456)

This invention relates to new fungicidal compounds and a process of controlling fungi therewith.

It has been found that compounds of the formula

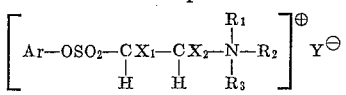

in which Ar is an aromatic radical which may be substituted by one or more halogen atoms, alkyl, nitro, hydroxyl, acyl, formyl, ethoxy, methoxy, nitrile, acylamino or thiocyanate groups, $X_1$ is hydrogen, an alkyl radical or halogen and $X_2$ is hydrogen, an alkyl radical or halogen, $R_1$, $R_2$ and $R_3$ are alkyl radicals and Y is an anion, such as halogen, I⁻, Br⁻, Cl⁻, $CH_3OSO_3^-$, $CH_2=CHSO_3^-$, acetate or sulfate, have an excellent fungicidal action. The compounds are particularly suitable for treating seeds or plants before planting. They are also suitable for the control of fungi in the earth, for example, by moistening the earth with an aqueous solution of the compound. The nature of the anion has no significant influence on the fungicidal effect and the anion may be selected as desired. The compounds are also suitable for the control of fungi in cooling water systems and on leather.

The compounds are readily obtainable by reacting esters of aromatic hydroxyl compounds of α,β-olefinically unsaturated sulfonic acids (see pending U.S. patent application Serial No. 43,009, filed July 15, 1960, by Harry Distler) with secondary amines followed by alkylation to yield a quaternary ammonium salt according to the following equation:

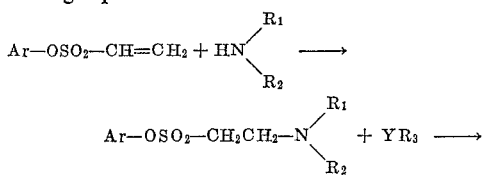

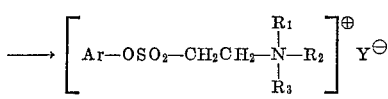

where Ar, $R_1$, $R_2$, $R_3$ and Y have the meanings given above.

The preparation of a compound to be employed according to the invention is described in the following. Other compounds can be obtained in an analogous way. The parts specified are parts by weight.

126 parts dimethyl sulfate and 500 parts benzene are run into 229 parts of the phenyl ester of N-dimethyl-β-aminoethanesulfonic acid and 500 parts benzene with stirring at a temperature of 20° C. to 40° C. A reduction in the evolution of heat indicates that the exothermic reaction is complete.

The substance which precipitates from the benzene solution is separated off and washed with 1000 parts benzene. After drying, 312 parts of the phenyl ester of N-trimethyl-β-aminoethanesulfonic acid methyl sulfate is obtained. This is a yield of 87.8% of the theory. The substance melts at 129° C. and has the following formula:

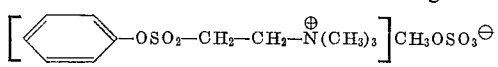

The fungicides according to the invention are obtained by mixing the active substances with diluents or carriers, such as water and organic liquids, dispersing or wetting agents, solid substances or mixtures thereof. The admixture of other active substances, such as those with acaricidal, insecticidal, ovicidal, herbicidal, fungicidal or bactericidal action is possible. The substances described in the invention are applied by the usual methods, i.e., by treating the objects or plants to be protected against fungicidal attack with a fungitoxic amount of active substance. To prevent fungus growth in cooling water systems, a fungitoxic amount of active substance is dissolved in the cooling water. The new substances are miscible with water in all proportions.

The following examples illustrate the application of the fungicides.

EXAMPLE 1

Mixtures of 65 parts active substance and 35 parts talc are finely ground. 2 g. of these mixtures are applied uniformly to 1 kg. of seed peas of the variety Senator. 100 peas are then planted in seed boxes in strongly infected compost. The peas which have germinated after 7 and 14 days are counted.

TABLE

| Substance | Number of peas germinated after— | |
|---|---|---|
| | 7 Days | 14 Days |
| 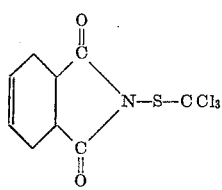 | 83 | 84 |
| | 83 | 82 |
| Comparative substance | 76 | 71 |
| Control (untreated) | 8 | 5 |

EXAMPLE 2

The active substances are added in varying quantities down to 1 p.p.m. to a nutrient solution which provides optimum conditions for the growth of the fungus *Aspergillus niger*. 20-ml. portions of the nutrient solutions treated in this way and contained in 100 ml. Erlenmeyer flasks are inoculated with 0.3 mg. Aspergillus spores. The flasks are maintained for 120 hours at 36° C. and the degree of fungus growth, which takes place preferentially at the surface of the nutrient solution, is assessed. The results are as given in the table below in which 0 indicates no fungus growth, while 5 indicates uninhibited fungus growth, the fungus completely covering the surface of the nutrient solution.

*Inhibitory effect on Aspergillus niger*

| Fungicide | Quantity of Fungicide in the nutrient solution in p.p.m. | | | | | |
|---|---|---|---|---|---|---|
| | 50 | 25 | 10 | 5 | 2.5 | 1 |
| C$_6$H$_5$—OSO$_2$—CH$_2$—CH$_2$—N$^{\oplus}$(CH$_3$)$_3$ ·⅓ CH$_3$OSO$_3^{\ominus}$ | 0 | 0 | 2 | 3 | 5 | 5 |
| 2-Cl-C$_6$H$_4$—OSO$_2$—CH$_2$—CH$_2$—N$^{\oplus}$(CH$_3$)$_3$ ·⅓ CH$_3$OSO$_3^{\ominus}$ | 0 | 0 | 0 | 1 | 3 | 5 |
| 4-Cl-C$_6$H$_4$—OSO$_2$—CH$_2$—CH$_2$—N$^{\oplus}$(CH$_3$)$_3$ ·⅓ CH$_3$OSO$_3^{\ominus}$ | 0 | 0 | 0 | 2 | 3 | 5 |
| 2,4-Cl$_2$-C$_6$H$_3$—OSO$_2$—CH$_2$—CH$_2$—N$^{\oplus}$(CH$_3$)$_3$ ·⅓ CH$_3$OSO$_3^{\ominus}$ | 0 | 0 | 0 | 2 | 3 | 5 |
| 2,5-Cl$_2$-C$_6$H$_3$—OSO$_2$—CH$_2$—CH$_2$—N$^{\oplus}$(CH$_3$)$_3$ ·⅓ CH$_3$OSO$_3^{\ominus}$ | 0 | 0 | 0 | 3 | 5 | 5 |
| 2,4,5-Cl$_3$-C$_6$H$_2$—OSO$_2$—CH$_2$—CH$_2$—N$^{\oplus}$(CH$_3$)$_3$ ·⅓ CH$_3$OSO$_3^{\ominus}$ | 0 | 0 | 0 | 3 | 4 | 5 |
| 2,3,4-Cl$_3$-C$_6$H$_2$—OSO$_2$—CH$_2$—CH$_2$—N$^{\oplus}$(CH$_3$)$_3$ ·⅓ CH$_3$OSO$_3^{\ominus}$ | 0 | 0 | 3 | 5 | 5 | 5 |
| 4-Cl-2-CH$_3$-C$_6$H$_3$—OSO$_2$—CH$_2$—CH$_2$—N$^{\oplus}$(CH$_3$)$_3$ ·⅓ CH$_3$OSO$_3^{\ominus}$ | 0 | 0 | 0 | 4 | 5 | 5 |
| Control (untreated) | 5 | 5 | 5 | 5 | 5 | 5 |

We claim:
Compounds of the formula

$$\left[ Ar-OSO_2-\underset{H}{\overset{}{C}H_1}-\underset{H}{\overset{}{C}H_2}-\overset{R_1}{\underset{R_3}{\overset{|}{N}}}-R_2 \right]^{\oplus} Y^{\ominus}$$

in which Ar is a member selected from the group consisting of phenyl, phenyl substituted by chlorine, and phenyl substituted by methyl, $R_1$, $R_2$ and $R_3$ are lower alkyl radicals and Y is an anion.

References Cited in the file of this patent

UNITED STATES PATENTS

| | | |
|---|---|---|
| 2,727,057 | Park | Dec. 13, 1955 |
| 2,728,788 | Waldron et al. | Dec. 27, 1955 |
| 2,775,608 | Sprague et al. | Dec. 25, 1956 |
| 2,905,587 | Dowling | Sept. 22, 1959 |
| 2,913,370 | Gaertner et al. | Nov. 17, 1959 |
| 3,079,436 | Hwa | Feb. 26, 1963 |

OTHER REFERENCES

Nerdel et al.: Ber. Deut. Chem., vol. 92, pp. 2460–2468 (1959).